United States Patent [19]
Patel et al.

[11] Patent Number: 5,938,761
[45] Date of Patent: Aug. 17, 1999

[54] METHOD AND APPARATUS FOR BRANCH TARGET PREDICTION

[75] Inventors: Sanjay Patel; Adam R. Talcott, both of Santa Clara; Rajasekhar Cherabuddi, Sunnyvale, all of Calif.

[73] Assignee: Sun Microsystems, Palo Alto, Calif.

[21] Appl. No.: 08/976,826

[22] Filed: Nov. 24, 1997

[51] Int. Cl.$^6$ .................................................. G06F 9/32
[52] U.S. Cl. ............................................................ 712/238
[58] Field of Search .................................. 712/230, 233, 712/238

[56] References Cited

U.S. PATENT DOCUMENTS

| | | | |
|---|---|---|---|
| 4,155,119 | 5/1979 | DeWard et al. | 711/206 |
| 5,537,560 | 7/1996 | Boggs et al. | 395/375 |
| 5,574,871 | 11/1996 | Hoyt et al. | 395/376 |
| 5,625,788 | 4/1997 | Boggs et al. | 395/390 |
| 5,740,415 | 4/1998 | Hara | 395/585 |
| 5,867,698 | 2/1999 | Cumming et al. | 395/585 |

*Primary Examiner*—David Y. Eng
*Attorney, Agent, or Firm*—Park & Vaughan

[57] ABSTRACT

One embodiment of the present invention provides a method and an apparatus for predicting the target of a branch instruction. This method and apparatus operate by using a translation lookaside buffer (TLB) to store page numbers for predicted branch target addresses. In this embodiment, a branch target address table stores a small index to a location in the translation lookaside buffer, and this index is used retrieve a page number from the location in the translation lookaside buffer. This page number is used as the page number portion of a predicted branch target address. Thus, a small index into a translation lookaside buffer can be stored in a predicted branch target address table instead of a larger page number for the predicted branch target address. This technique effectively reduces the size of a predicted branch target table by eliminating much of the space that is presently wasted storing redundant page numbers. Another embodiment maintains coherence between the branch target address table and the translation lookaside buffer. This makes it possible to detect a miss in the translation lookaside buffer at least one cycle earlier by examining the branch target address table.

26 Claims, 9 Drawing Sheets

METHOD AND APPARATUS FOR BRANCH TARGET PREDICTION

BACKGROUND

1. Field of the Invention

The present invention relates generally to branch target address prediction in a computer system, and more specifically to a method and an apparatus for predicting the target of a branch instruction, by indexing a translation lookaside buffer to retrieve a page number portion of a predicted branch target address.

2. Related Art

Early computers generally processed instructions one at a time, with each instruction being processed in four sequential stages: instruction fetch, instruction decode, execute and result write-back. Within such early computers, different logic blocks performed each processing stage, and each logic block waited until all the preceding logic blocks completed before performing its operation.

To improve efficiency, processor designers now overlap operations of the processing stages. This enables a processor to operate on several instructions simultaneously. During a given time period, the fetch, decode, execute and write-back logic stages process different sequential instructions in a computer's instruction stream at the same time. At the end of each clock period, the result of each processing stage proceeds to the next processing stage.

Processors that use this technique of overlapping processor stages are known as "pipelined" processors. Some processors further divide each stage into sub-stages for additional performance improvement. Such processors are referred to as "deeply pipelined" processors.

In order for a pipelined processor to operate efficiently, an instruction fetch unit at the head of the pipeline must continually provide the pipeline with a stream of processor instructions. However, branch instructions within an instruction stream prevent the instruction fetch unit from fetching subsequent instructions until the branch condition is fully resolved. In pipelined processors, the branch condition will not be fully resolved until the branch condition reaches and instruction execution stage near the end of the processor pipeline. Hence, the instruction fetch unit will stall when an unresolved branch condition prevents the instruction fetch unit from knowing which instruction to fetch next.

To alleviate this problem, some pipelined processors use branch prediction mechanisms to predict the outcome of branch instructions. This can involve predicting the target of a branch instruction as well as predicting the condition of the branch. These predictions are used to determine a predicted path for the instruction stream in order to fetch subsequent instructions. When a branch prediction mechanism predicts the outcome of a branch instruction, and the processor executes subsequent instructions along the predicted path, the processor is said to have "speculatively executed" along the predicted instruction path. During speculative execution, the processor is performing useful work if the branch instruction was predicted correctly. However, if the branch prediction mechanism mispredicted the result of the branch instruction, the processor is speculatively executing instructions down the wrong path and is not performing useful work. When the processor eventually detects the mispredicted branch, the processor must flush all the speculatively executed instructions and restart execution from the correct address.

Branch prediction involves predicting the outcome of a branch to determine whether or not the branch is taken. Branch prediction also involves predicting the target address of a branch to determine where the branch will go to if it is taken.

Computer systems that perform branch prediction typically store predicted target addresses in a table known as a "branch target address table" or a "branch target buffer." Branch target address tables often include a large number of entries in order provide predicted target addresses for a large number of branch instructions to effectively improve processor performance. Additionally, each entry contains a branch target address, which can be many bytes in size. Consequently, a branch target address table may grow to be quite large. A branch target address typically includes a page number portion, comprising higher order bits which specify a page number, and a page offset portion, comprising lower order bits specifying an offset into a page. If a branch target address table grows too large, multiple cycles may be required to access the table, and the prediction success rate will fall as the table is used to predict branch targets for instructions further down the pipeline. Furthermore, computer instruction streams tend to exhibit a large amount of locality. This means that even though a predicted branch target table may contain a large number of entries, these entries tend to be concentrated in a relatively small number of pages of memory. Hence, much of the space in a conventional branch target address table is wasted storing redundant page numbers.

What is needed is a method and an apparatus for storing branch target addresses that reduces the size of a predicted branch target table by reducing the amount of storage required to store branch target addresses.

SUMMARY

One embodiment of the present invention provides a method and an apparatus for predicting the target of a branch instruction. This method and apparatus operate by using a translation lookaside buffer (TLB) to store page numbers for predicted branch target addresses. In this embodiment, a branch target address table stores a small index to a location in the translation lookaside buffer, and this index is used to retrieve a page number from the location in the translation lookaside buffer. This page number is used as the page number portion of a predicted branch target address. Thus, a small index into a translation lookaside buffer can be stored in a predicted branch target address table instead of a larger page number for the predicted branch target address. This technique effectively reduces the size of a predicted branch target table by eliminating much of the space that is presently wasted storing redundant page numbers. Another embodiment maintains coherence between the branch target address table and the translation lookaside buffer. This makes it possible to detect a miss in the translation lookaside buffer at least one cycle earlier by examining the branch target address table.

Thus, one embodiment of the present invention can be characterized as a method for retrieving a predicted target of a branch instruction. The method starts with a current instruction address specifying a virtual address of a currently executing instruction. It uses this current instruction address to index an entry from a branch target address table; this entry includes a predicted branch target address in the form of a page index and a page offset. Next, the page index is used to retrieve an entry from a translation lookaside buffer containing a page number for the predicted branch target address. The method then uses the page number, from the translation lookaside buffer, and the page offset, from the branch target address table, to retrieve an instruction from the instruction cache.

In another embodiment of the present invention, the branch target address table includes a virtual page number array for storing page indexes, and a separate next fetch address table for storing page offsets.

In another embodiment of the present invention, the page number retrieved from the translation lookaside buffer includes a virtual page number that forms part of the predicted branch target address. In another embodiment, the page number includes a physical page number that is used to facilitate a lookup for the instruction in a virtually-indexed physically-tagged cache.

In another embodiment of the present invention, the method includes updating the branch target table to specify a corrected branch target address if the predicted branch target address is incorrect.

In another embodiment of the present invention, the method includes invalidating a page index in the branch target table if a corresponding entry in the translation lookaside buffer is modified.

Another embodiment of the present invention can be characterized as an apparatus for retrieving a predicted target address of a branch instruction. This apparatus includes a translation lookaside buffer (TLB), for translating virtual to physical page numbers. This TLB includes a plurality of entries, which include a virtual page number and a corresponding physical page number. The TLB is coupled to a content addressable indexing structure, which can be used to look up an entry in the TLB based upon a virtual page number. The TLB is also coupled to a direct indexing structure, which can be used to look up an entry in the TLB based upon an index to a location in the TLB. This apparatus also includes a virtual page number array containing indexes to entries in the TLB. The virtual page number array includes an input coupled to a current instruction address, and an output coupled to the direct indexing structure. In this way, the current instruction address references an index in the virtual page number array, and this index feeds through the output into the direct indexing structure of the TLB. This index references a page number for the predicted branch target address from the TLB, which appears at an output of the TLB. The apparatus also includes a next fetch address table, which contains page offsets for predicted branch target addresses. The next fetch address table includes an input and an output. The input is coupled to the current instruction address, so that the current instruction address references a page offset for the predicted branch target address, and this page offset appears at the output.

In a variation on the above embodiment, the next fetch address table and the virtual page number array reside in the same memory.

In another embodiment of the present invention, the apparatus includes an instruction fetch unit, including an input coupled to the predicted branch target address. This allows the instruction fetch unit to fetch an instruction from the predicted branch target address.

In another embodiment of the present invention, the apparatus includes an instruction cache coupled to the predicted branch target address, so that the predicted branch target address is used to look up an instruction from the instruction cache.

In yet another embodiment of the present invention, an index stored in the virtual page number array includes a thread identifier for indexing an entry from the TLB corresponding to a particular thread. (Note that in this specification a thread is defined to be an independent computational process or stream of execution through a computer program.)

In another embodiment of the present invention, the predicted branch target address specifies a start address of a block of instructions, and is used to retrieve the block of instructions.

In another embodiment of the present invention, the predicted branch target address is a predicted branch target address for a branch instruction that follows the instruction pointed to by the current instruction address.

In another embodiment of the present invention the above-mentioned apparatus is part of a computer system, which additionally includes a semiconductor memory, a non-volatile storage device; and a central processing unit.

DEFINITIONS

Multi-threading—using multiple threads in a computational system.

Next Fetch Address Table—a table containing page offsets for predicted branch target addresses.

Thread—an independent computational process or stream of execution through a computer program.

TLB—translation lookaside buffer, a mechanism for translating virtual page numbers to physical page numbers including a plurality of entries which include a virtual page number and a corresponding physical page number.

Virtual Page Number Array—a table containing indexes to physical locations in a translation lookaside buffer. These indexes are used to retrieve page numbers for predicted branch target addresses.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
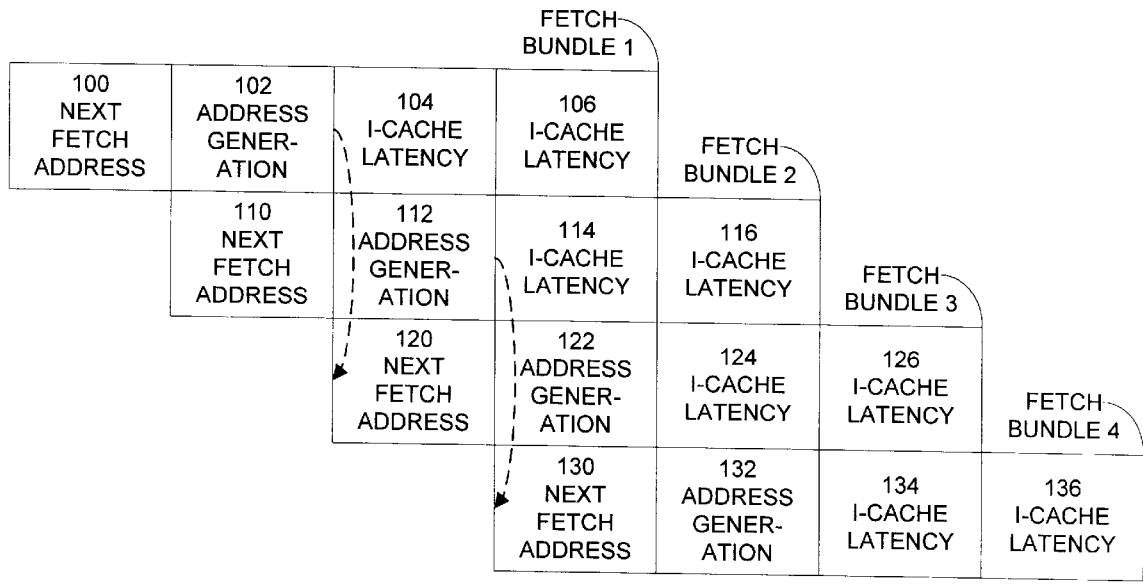
FIG. 1 is a diagram illustrating pipelined execution of instructions in accordance with an embodiment of the present invention.

FIG. 1 illustrates pipelined execution of instructions in accordance with an embodiment of the present invention. The operations associated with a given instruction are represented by rows. For example, the first row represents pipeline stages associated with fetch bundle 1. (A fetch bundle is a block of consecutive instructions that is retrieved from a computer system's memory and stored in the computer system's instruction cache.) The operations associated with fetch bundle 1 in the first row include next fetch address 100, address generation 102, instruction cache (I-cache) latency 104 and I-cache latency 106. The operations associated with fetch bundle 2 in the second row include next fetch address 110, address generation 112, I-cache latency 114 and I-cache latency 116. The operations associated with fetch bundle 3 in the third row include next fetch address 120, address generation 122, I-cache latency 124 and I-cache latency 126. The operations associated with fetch bundle 4 in the fourth row include next fetch address 130, address generation 132, I-cache latency 134 and I-cache latency 136.

During the next fetch address stage and the address generation instruction stage the computer system generates an address for the next instruction. This address may be a predicted branch target address, or it may be other addresses, as will be described below. Once this address is generated, it is used to retrieve an instruction from the I-cache. This I-cache retrieval takes up the next two successive pipeline stages.

The dashed arrows illustrate how addresses generated during preceding stages are passed backward in the pipeline, to initiate branch target prediction for a following instruction bundle. As illustrated in FIG. 1, the output of address generation stage 102 for fetch bundle 1 is an address which is passed back to next fetch address stage 120 for fetch bundle 3. This address is used to lookup a predicted branch target address for fetch bundle 3. Similarly for fetch bundle 2, the output of address generation stage 112 is an address which is passed back to next fetch address stage 130 for fetch bundle 4. This address is used to lookup a predicted branch target address for fetch bundle 4.

Figure 2:
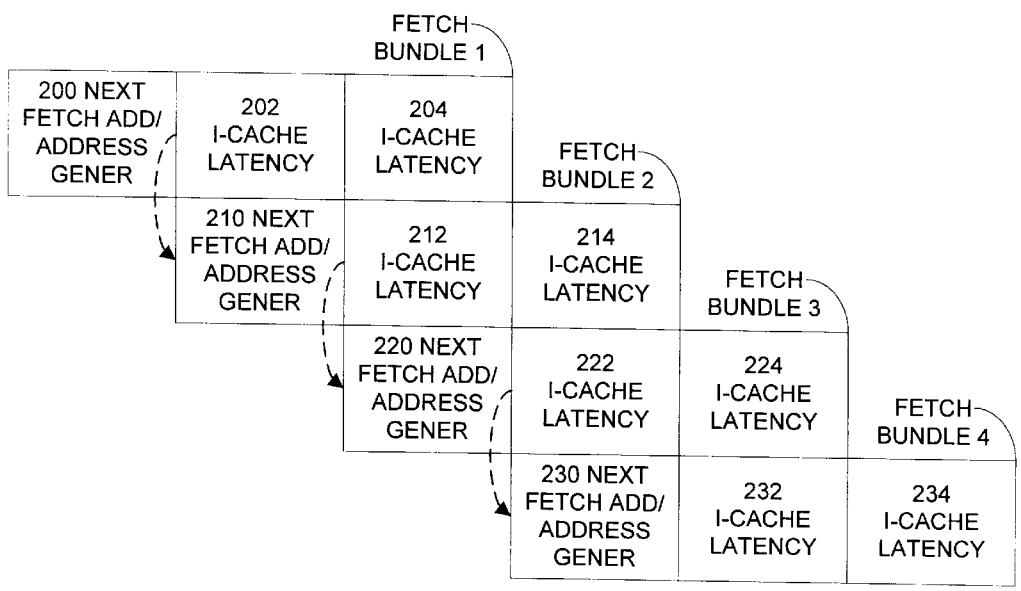
FIG. 2 is a diagram illustrating another form of pipelined execution in accordance with an embodiment of the present invention.

FIG. 2 illustrates another form of pipelined execution in accordance with an embodiment of the present invention. The diagram in FIG. 2 is the same as the diagram in FIG. 1, except for the fact that the next fetch address and address generation stages have been combined into a single stage. More particularly, the operations associated with fetch bundle 1 in the first row include: next fetch address/address generation 200, I-cache latency 202 and I-cache latency 204. The operations associated with fetch bundle 2 in the second row include: next fetch address/address generation 210, I-cache latency 212 and I-cache latency 214. The operations associated with fetch bundle 3 in the third row include: next fetch address/address generation 220, I-cache latency 222 and I-cache latency 224. The operations associated with fetch bundle 4 in the fourth row include: next fetch address/ address generation 230, I-cache latency 232 and I-cache latency 234.

In the embodiment illustrated in FIG. 2, the fetch address and address generation stages have been combined into a single stage. This allows the address of a fetch bundle to be used to predict the address of the next fetch bundle. Referring to the dashed arrows in FIG. 2, the address from next fetch/address generation stage 200 is used to predict a branch target address for fetch bundle 2; the address from next fetch/address generation stage 210 is used to predict a branch target address for fetch bundle 3; and the address from next fetch/address generation stage 220 is used to predict a branch target address for fetch bundle 4. This type of branch target prediction scheme tends to be more accurate than the scheme illustrated in FIG. 1 because there is less chance for the instruction stream to wander off to another branch target in the intervening fetch bundle. However, as processor clock speeds continue to increase, it is becoming much harder, if not impossible, to combine the next fetch address/address generation functions into a single pipeline stage.

Figure 3:
FIG. 3 illustrates how current instruction address 300 is divided into constituent components in accordance with an embodiment of the present invention.

FIG. 3 illustrates how current instruction address 300 is divided into constituent components in accordance with an embodiment of the present invention. In this embodiment, current instruction address 300 includes 46 bits, and is divided into a page number 305 of 31 bits CIA[45:15], and a page offset 310 of 15 bits CIA[14:0]. Page offset 310 is further divided into index CIA[14:5], index CIA[4:2], and byte offset CIA[1:0]. Although the present example illustrates the case of a virtual address of a specific size, the present invention can be applied to virtual addresses of any size. Furthermore, other embodiments of the present invention can include more entries in the branch target address table.

Index CIA[14:5] includes 10 bits that are used to look up a predicted branch target address. This is accomplished by using CIA[14:5] to look up page index in a virtual page number array. This page index is subsequently used to look up a page number in a translation lookaside buffer (TLB). CIA[14:5] is additionally used to lookup corresponding a page offset in a next fetch address table. The page number and page offset so obtained comprise the predicted branch target address.

Index CIA[4:2] includes three address bits which are used to specify an instruction from a fetch bundle including eight instructions. In the embodiment of the present invention related to FIG. 3, a line in the instruction cache includes eight instructions. Hence, a fetch bundle, which is used to fill an I-cache line, includes eight instructions.

Byte offset CIA[1:0] specifies a byte offset into a four-byte word of memory.

Figure 4:
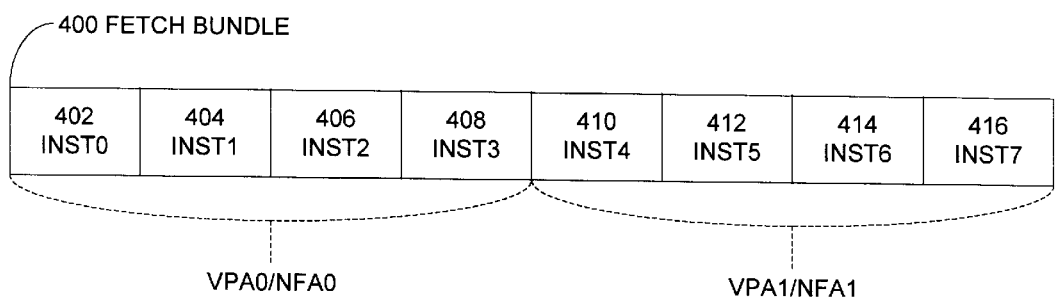
FIG. 4 illustrates how instruction fetch bundle 400 is associated with two predicted branch target addresses in accordance with an embodiment of the present invention.

FIG. 4 illustrates how instruction fetch bundle 400 is associated with two predicted branch target addresses in accordance with an embodiment of the present invention. In the embodiment illustrated in FIG. 4, fetch bundle 400 includes eight instructions 402, 404, 406, 408, 410, 412, 414, and 416. These eight instructions are divided into two blocks of four consecutive instructions, and a separate predicted branch target address is stored for each of these blocks. For example, the block containing instructions 402, 404, 406 and 408 is associated with a predicted branch target address stored in VPA0/NFA0, and the block containing instructions 410, 412, 414 and 416 is associated with a branch target address stored in VPA1/NFA1. (VPA0 and VPA1 refer to entries in a virtual page number array, and NFA0 and NFA1 refer to corresponding entries in a next fetch address table.) Other embodiments of the present invention provide different fetch bundle sizes and different numbers of blocks for each fetch bundle.

Figure 5:
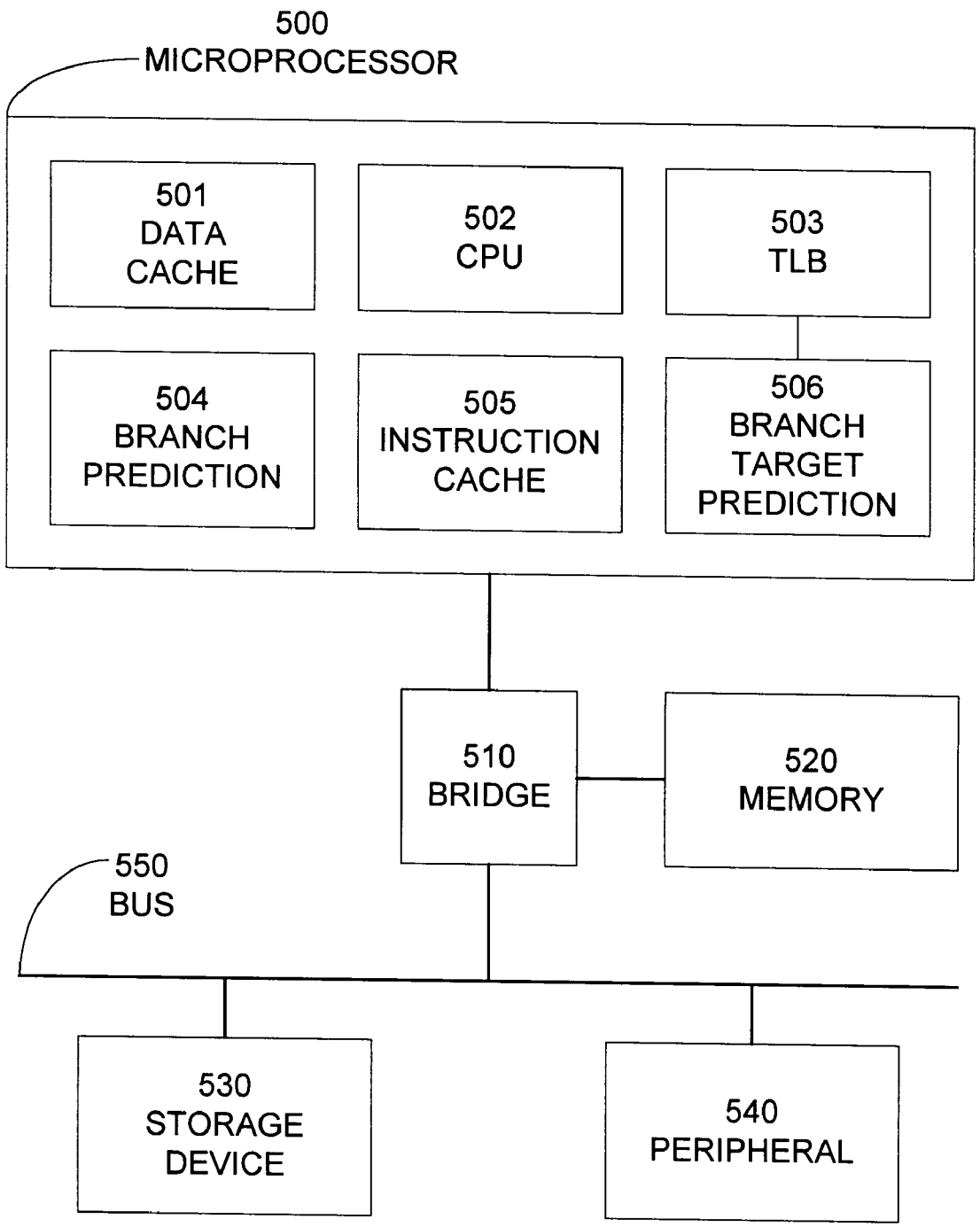
FIG. 5 illustrates a computer system including a microprocessor 500 with a branch target prediction mechanism 506 in accordance with an embodiment of the present invention.

FIG. 5 illustrates a computer system including a microprocessor 500 with a branch target prediction mechanism 506 in accordance with an embodiment of the present invention. The computer system illustrated in FIG. 5 is just one possible computer system, out of many possible computer systems, that the present invention can be applied to. In general, the present invention may be used in any computer system including a pipelined processor that performs branch prediction. This includes, but is not limited to, main frame computer systems, minicomputers, microprocessors and device controllers.

Microprocessor 500 is coupled to bus 550 and memory 520 through bridge 510. Bus 550 is coupled to storage device 530 and peripheral 540. Microprocessor 500 can communicate with memory 520 through bridge 510. Microprocessor 500 can additionally communicate with storage device 530 through bus 550. Storage device 530 contains non-volatile storage for storing data. In one embodiment, storage device 530 is a disk drive. Microprocessor 500 can also communicate with peripheral 540 through bus 550. Peripheral 540 can be any type of peripheral device for a computing system. This includes, but is not limited to, network interface controllers, input devices, output devices and data storage devices.

Within microprocessor 500 there are a number of units, including CPU (central processing unit) 502, instruction cache 505 and data cache 501. CPU 502 executes instructions from instruction cache 505 to manipulate data from data cache 501. Microprocessor 500 also includes translation lookaside buffer (TLB) 503, which stores recently used translations from virtual page numbers to physical page numbers. Microprocessor 500 additionally includes branch prediction unit 504 and branch target unit 506 which together perform branch prediction for speculative execution. As illustrated in FIG. 5, branch target prediction unit 506 cooperates with TLB 503 to retrieve predicted branch target addresses.

Figure 6:
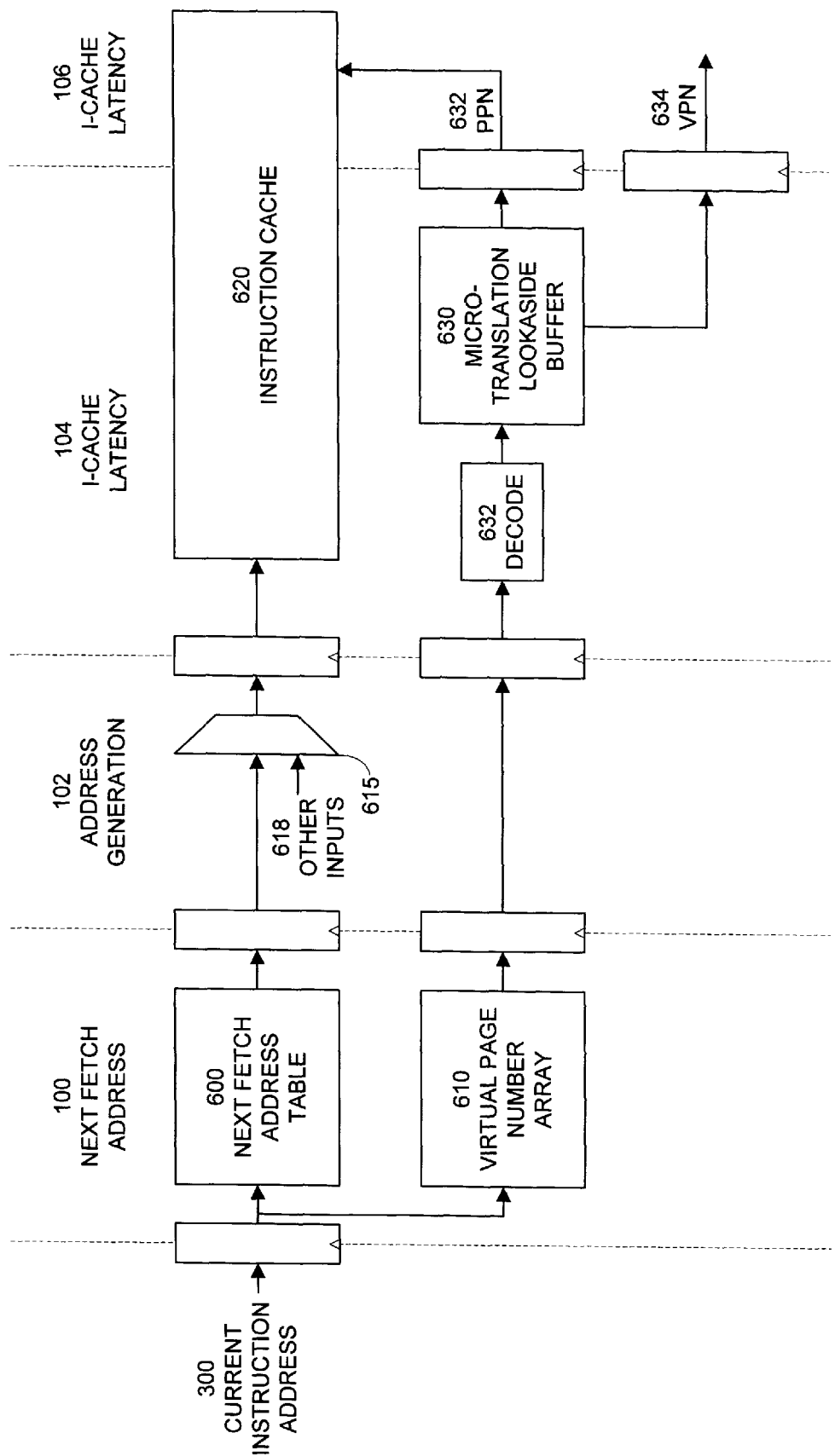
FIG. 6 illustrates an apparatus for branch target prediction including a virtual page number array 600, which indexes a micro-translation lookaside buffer 630 in accordance with an embodiment of the present invention.

FIG. 6 illustrates an apparatus for branch target prediction including virtual page number array 610, which indexes a micro-translation lookaside buffer (micro-TLB) 630 in accordance with an embodiment of the present invention. The circuitry illustrated in FIG. 6 corresponds to TLB 503 coupled with branch target prediction unit 506 in FIG. 5. The apparatus illustrated in FIG. 6 is divided into four pipeline stages corresponding to the pipeline stages illustrated in FIG. 1. These stages include next fetch address stage 100, address generation stage 102, I-cache latency stage 104 and I-cache latency stage 106. As can be seen from FIG. 6, signals passing between pipeline stages pass through clocked registers.

In the illustrated embodiment, a current instruction address 300 feeds into the left-hand-side of FIG. 6. Some of the bits of current instruction 300 feed into next fetch address table 600 and virtual page number array 610. These bits are used to lookup entries in next fetch address table 600 and virtual page number array 610. Next fetch address table 600 contains page offsets for predicted branch target addresses, and virtual page number array 610 stores indexes for indexing page numbers for predicted branch target addresses from micro-TLB 630.

The output of next fetch address table 600 feeds through multiplexer 615 (in stage 102), and then into I-cache 620 (in stage 104). Multiplexer 615 additionally receives other inputs 618. This allows multiplexer 615 to selectively gate the other inputs 618 into instruction cache 620. In one embodiment of the present invention, other inputs 618 include: a sequential address of the next fetch bundle, a trap address and a corrected branch target address. When the output of next fetch address table 600 (or the other inputs 618) reaches instruction cache 620 (in stage 108), the output can be used to initiate an I-cache access. The page number is not required to initiate the I-cache access because the page number is not required until stage 106 for tag comparison purposes.

The output of virtual page number array 610 is an index that feeds through stage 102 into decoder 632 in stage 104. This index is used to lookup an entry in micro-TLB 630, which includes a physical page number (PPN) 632 and a virtual page number (VPN) 634.

As illustrated in FIG. 6, PPN 632 feeds into instruction cache 620 in stage 106. In this embodiment, instruction cache 620 is a virtually-indexed physically-tagged cache, and PPN 632 is used for tag comparison purposes. In another embodiment, instruction cache 620 is a virtually-indexed virtually-tagged cache. In this embodiment, VPN 634 feeds into I-cache 104, and is used for the tag comparison purposes. At the end of state 620, the desired predicted branch target instruction is finally retrieved from instruction cache 620. VPN 634 is also compared against an established target address of a PC-relative branch operation to determine a branch target mispredict.

Figure 7:
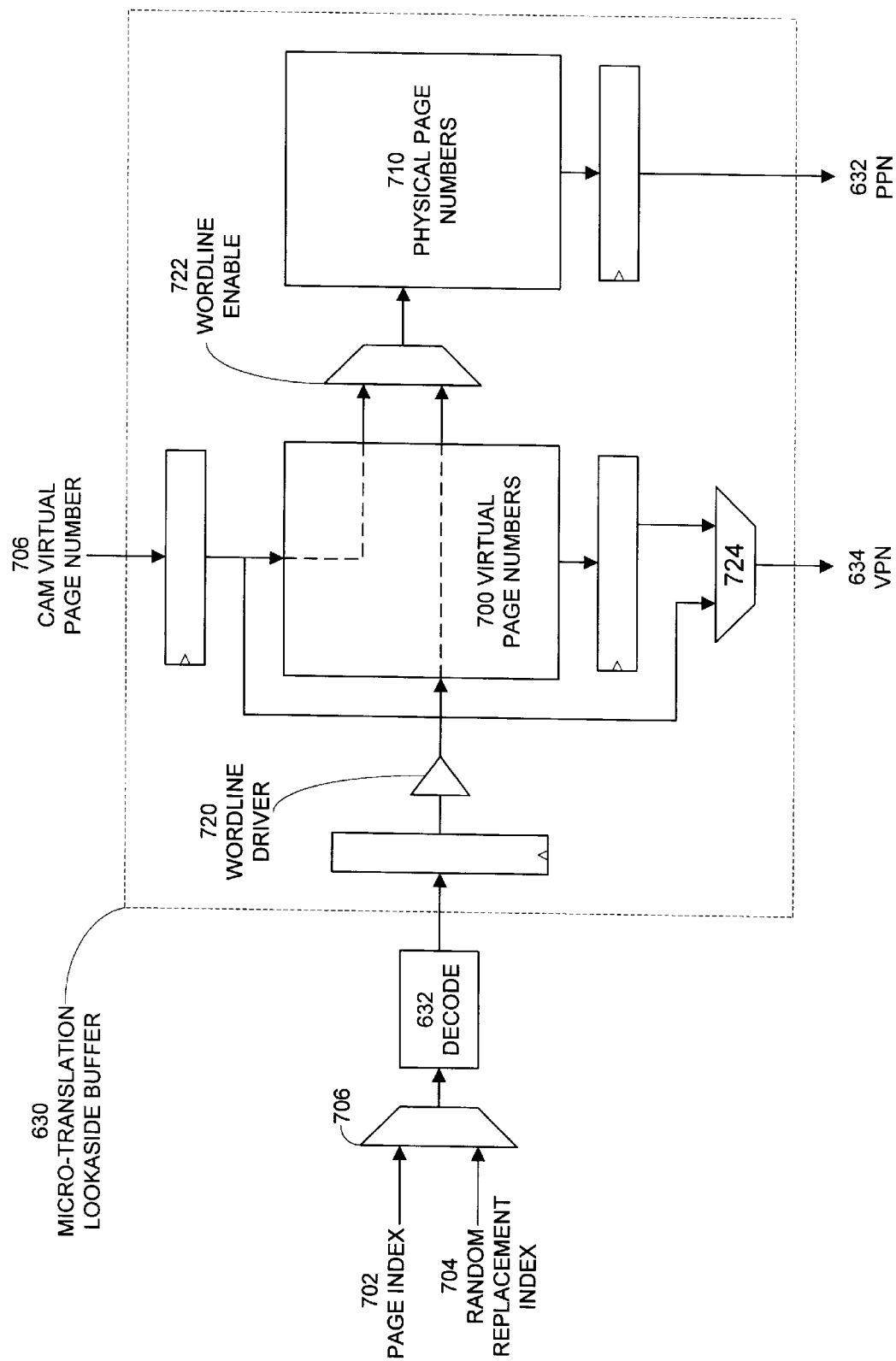
FIG. 7 illustrates the structure of micro-translation lookaside buffer 630, including a content addressable addressing structure and a direct indexing structure in accordance with an embodiment of the present invention.

FIG. 7 illustrates part of the internal structure of micro-TLB 630, including a content addressable indexing structure and direct indexing structure in accordance with an embodiment of the present invention. The direct indexing structure facilitates a lookup using a page index, such as page index 702 from virtual page number array 610. Micro-TLB 630 contains virtual page numbers 700 and corresponding physical page numbers 710. During operation, an entry from virtual page numbers 700 and a corresponding entry from physical page numbers 710 are retrieved to appear as outputs VPN 624 and PPN 632.

Micro-TLB 630 supports content addressable indexing as well as direct indexing. The content addressable indexing is used during an alternative method of indexing into the translation lookaside buffer, wherein a virtual page number is presented to micro-TLB 630 in order to obtain a corresponding physical page number. Referring to FIG. 6, CAM virtual page number 706 enters micro-TLB 630 from the top, and is used to perform a CAM (content addressable memory) lookup into virtual page number 700. During a CAM lookup, virtual page number 706 is compared against all of the entries within virtual page numbers 706. If virtual page number 706 matches an entry, the entry appears at the output of micro-TLB 630 as VPN 634. At the same time, a corresponding physical page number is enabled from physical page numbers 710 using wordline enable 722. This corresponding physical page number appears at the output of micro-TLB 630 as PPN 632. Note that wordline enable 722 can select between a direct index enable from wordline driver 720 and an enable from a CAM search. In other embodiments of the present invention, micro-TLB 630 does not support fully associative content addressable indexing, but rather supports set-associative content addressable indexing.

Alternatively, micro-TLB 630 can be directly indexed with page index 702. In the illustrated embodiment, page index 702 feeds through multiplexer 706 into decode 632, which decodes page index 702 and activates an appropriate wordline driver 720. This causes a selected entry from virtual page numbers 700 to appear as VPN 634. The enable signal also feeds through wordline enable 722 to cause a corresponding entry within physical page numbers 710 to appear as PPN 632. Multiplexer 706 can additionally feed random replacement index 704 into decode 632. Random replacement index 704 is used to index an entry in micro-TLB 630 for purposes of random replacement of an entry to make room for a new entry in micro-TLB 630. Other embodiments of the present invention support different types of replacement, including least recently used (LRU), and last-in-first-out (LIFO).

In one embodiment of the present invention, page index 702 is four bits in size so that it decodes to select one of 16 entries in micro-TLB 630. In another embodiment, page index 702 includes a two-bit thread index to select a page number from micro-TLB 630 corresponding to a particular thread. In this embodiment, when a thread dies all entries associated with the thread are invalidated. In another embodiment, a valid bit is associated with each entry in micro-TLB 630.

In another embodiment of the present invention, coherency is maintained between virtual page number array 610 and micro-TLB 630 by invalidating entries in virtual page number array 610 when corresponding entries in micro-TLB 630 are overwritten. This allows a miss in micro-TLB 630 to be detected at least one cycle early during the lookup in virtual page number array 610.

Figure 8:
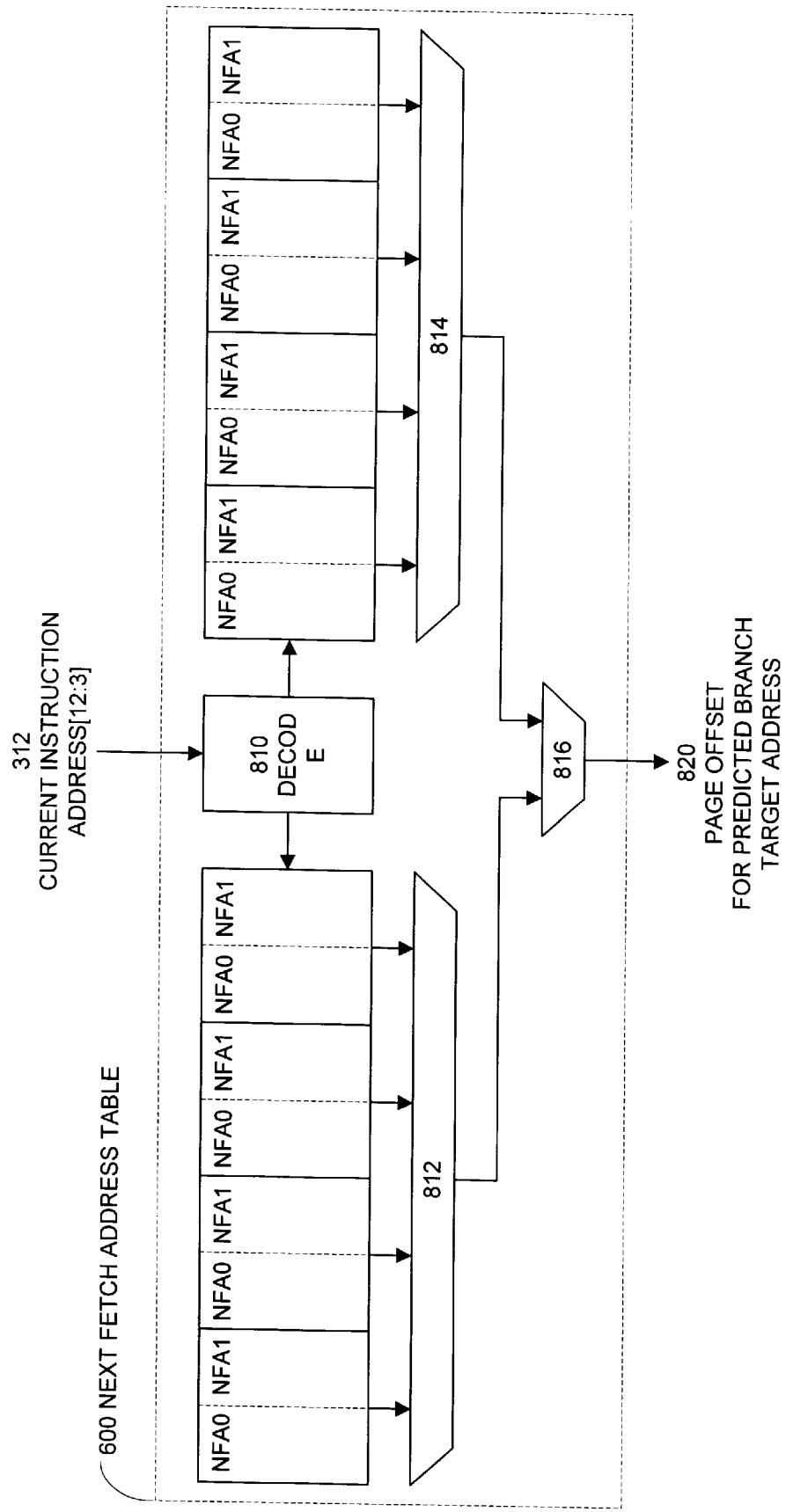
FIG. 8 illustrates the internal structure of next fetch address table 600 in accordance with an embodiment of the present invention.

FIG. 8 illustrates the internal structure of next fetch address table 600 in accordance with an embodiment of the present invention. In the embodiment illustrated in FIG. 8, next fetch address table 600 is effectively a random access memory. Next fetch address table 600 takes as input an address from current instruction address[14:5], and outputs a NFA0/NFA1 pair 820 containing page offsets for the two predicted branch target addresses associated with current instruction address 300. In this embodiment, each entry pair NFA0/NFA1 includes 30 bits. In the illustrated embodiment, next fetch address table 600 is divided into two banks, each of which is interleaved four ways. This interleaved structure can lead to an advantageous layout for implementation in a microprocessor chip.

Figure 9:
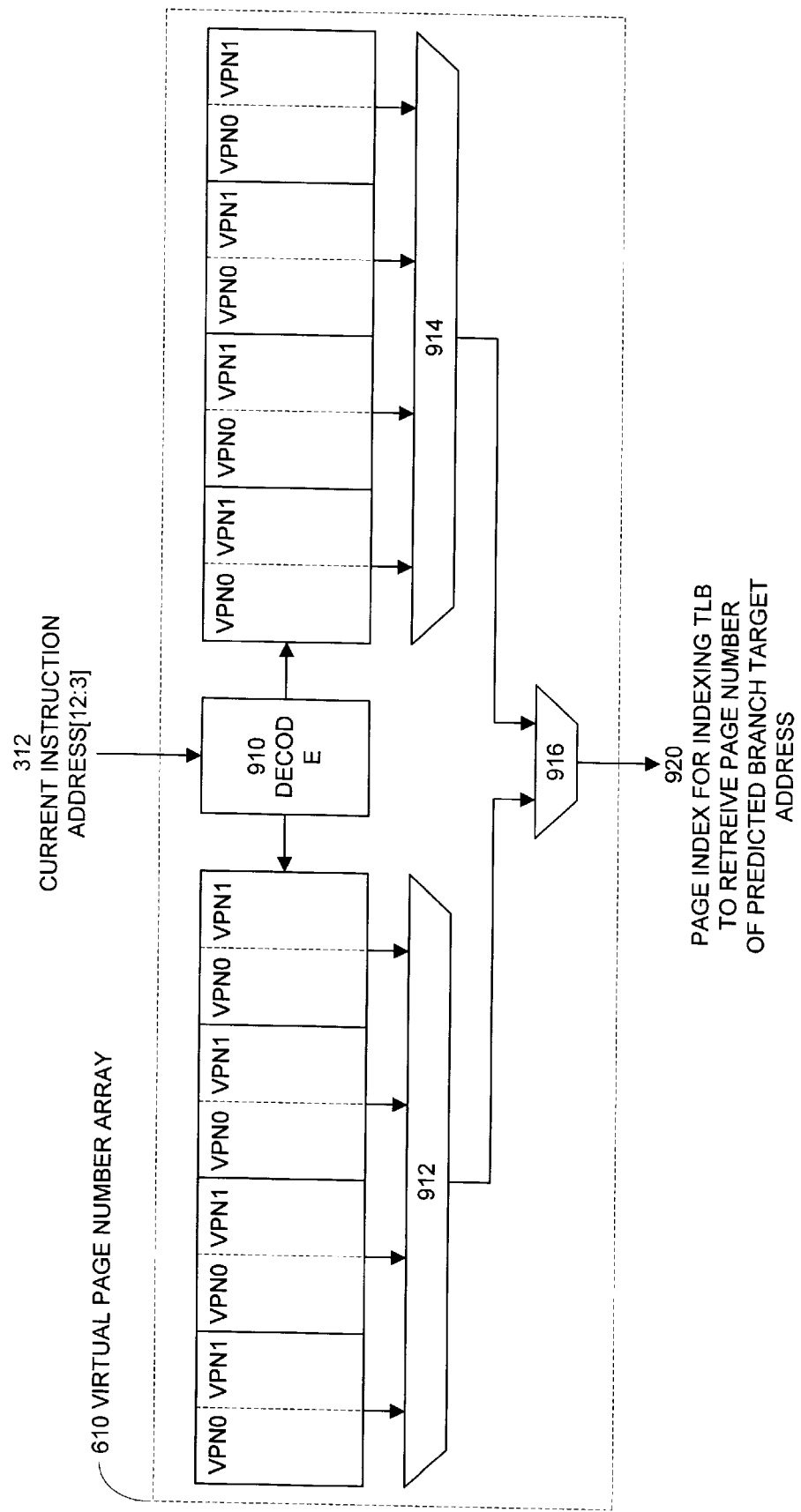
FIG. 9 illustrates the internal structure of virtual page number array 610 in accordance with an embodiment of the present invention.

FIG. 9 illustrates the internal structure of virtual page number array 610 in accordance with an embodiment of the present invention. As can be seen from FIG. 9, the structure of virtual page number array 610 is almost identical to the structure of next fetch address table 600. Virtual page number array takes as input an address from current instruction address[14:5], and outputs a VPN0/VPN1 pair 920. This VPN0/VPN1 pair 920 contains indexes for indexing page numbers of predicted branch target addresses from micro-TLB 630. In this embodiment, each entry VPN0/VPN1 includes 8 bits. In the illustrated embodiment, virtual page number array 610 is divided into two banks, each of which is interleaved four ways.

Figure 10:
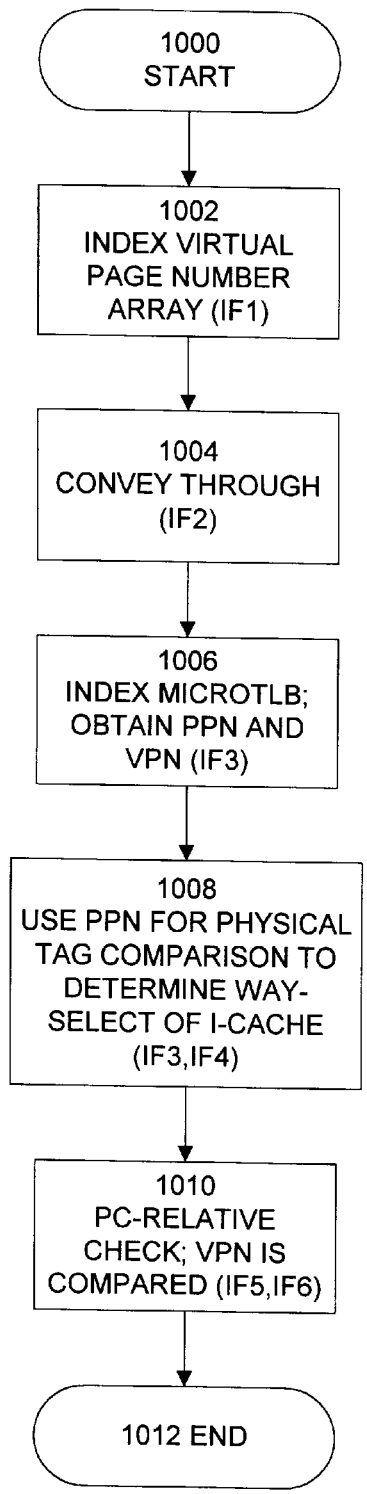
FIG. 10 is a flow chart illustrating operations associated with a read of virtual page number array 610 in accordance with an embodiment of the present invention.

FIG. 10 is a flow chart illustrating operations associated with a read of virtual page number array 610 in accordance with an embodiment of the present invention. This flow chart refers to pipeline stages IF1, IF2, IF3, IF4, IF5 and IF6. These pipeline stages correspond to pipeline stages 100, 102, 104 and 106 and following stages, respectively, from FIG. 1. FIG. 10 starts in state 1000. The system next proceeds to state 1002. In state 1002, the system indexes virtual page number array 610 using current instruction address[14:5] 312 to produce a page index 702. The system next proceeds to state 1004. In state 1004, the system conveys page index 702 through pipeline stage IF2. The system next proceeds to state 1006. In state 1006, the system indexes micro-TLB 630 using page index 702 to obtain VPN 634 and PPN 632. The system then proceeds to state 1008. In state 1008, the system uses PPN 632 to perform a physical tag comparison to select a line from instruction cache 620. The system next proceeds to state 1010. In state 1010, the system computes a PC relative branch target and compares the actual branch target against VPN 634 to determine whether or not the branch target was mispredicted. The system then proceeds to state 1012, which is an end state.

Figure 11:
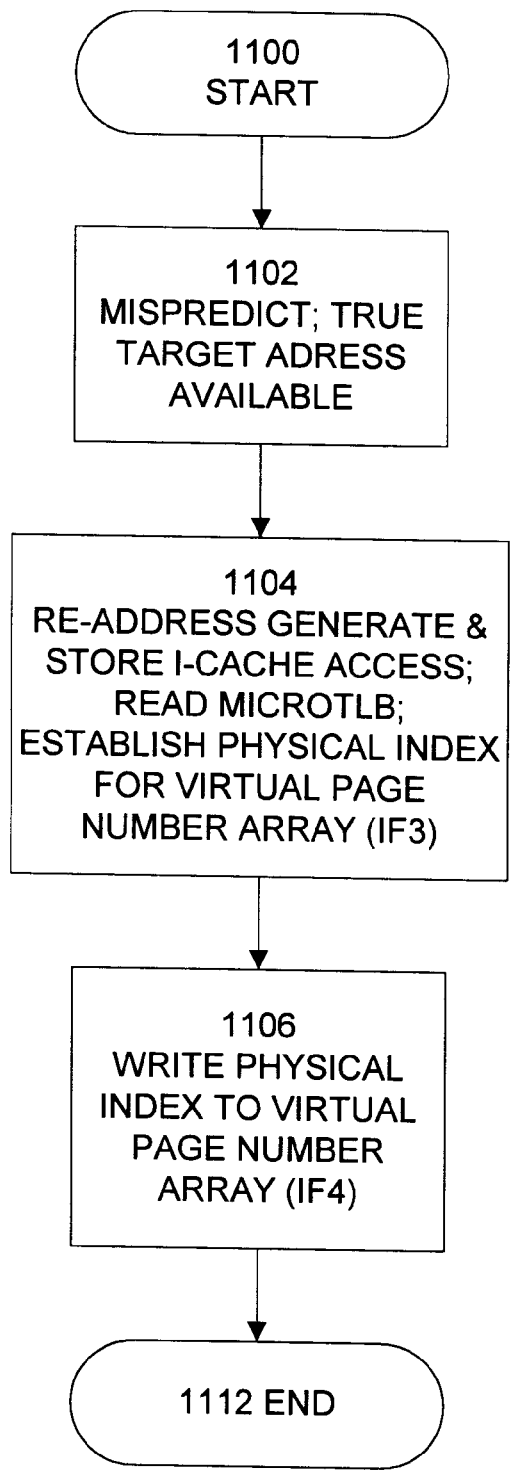
FIG. 11 is a flow chart illustrating operations associated with a write/update of virtual page number array 610 in accordance with an embodiment of the present invention.

FIG. 11 is a flow chart illustrating operations associated with a write/update of virtual page number array 610 in accordance with an embodiment of the present invention. The system starts in state 1100. The system next proceeds to state 1102, in which a mispredict occurs, and a true branch target address is available. In one embodiment of the present invention, this mispredict is detected in state 110 from FIG. 10. The system next proceeds to state 1104. In state 1104, the system re-generates an address. It also reads micro-TLB 630 to establish a physical index corresponding to the virtual page of the true branch target address. The system next proceeds to state 1106. In state 1106, the system updates an entry in virtual page number array 610 by writing the physical index obtained in state 1104 into virtual page number array 610. The system then proceeds to state 1112, which is an end state.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A method for retrieving a predicted target of a branch, comprising:

receiving a current instruction address specifying a virtual address of a currently executing instruction;

using the current instruction address to index an entry from a branch target address table, the entry including a page index and a page offset specifying a predicted branch target address;

using the page index to retrieve an entry from a translation lookaside buffer, the entry containing a page number; and retrieving an instruction from the predicted branch target address, the predicted branch target address including the page number from the translation lookaside buffer and the page offset from the branch target address table.

2. The method of claim 1, wherein the page index is smaller than the page number, so that storing the page index in the branch target address table requires less space than storing the page number.

3. The method of claim 1, wherein the branch target address table includes:

a virtual page number array containing page indexes for indexing page numbers for predicted branch target addresses from the translation lookaside buffer; and a next fetch address table containing page offsets for predicted branch target addresses.

4. The method of claim 1, wherein the using of the page index to retrieve an entry from the translation lookaside buffer includes directly accessing an entry from the translation lookaside buffer by feeding the page index through a decoder coupled to the translation lookaside buffer.

5. The method of claim 1, wherein the page number includes a virtual page number that forms part of the predicted branch target address.

6. The method of claim 1, wherein the page number includes a physical page number that is used to facilitate a lookup for the instruction in a virtually-indexed physically-tagged cache.

7. The method of claim 1, including updating the branch target table to specify a corrected branch target address if the predicted branch target address is incorrect.

8. The method of claim 1, wherein the using of the page index to retrieve an entry from the translation lookaside buffer includes using a thread identifier from the page index to retrieve an entry from the translation lookaside buffer corresponding to a particular thread.

9. The method of claim 1, including invalidating a page index in the branch target table if a corresponding entry in the translation lookaside buffer is modified.

10. The method of claim 1, wherein the retrieving of the instruction from the predicted branch target address includes retrieving a block of instructions.

11. The method of claim 1, wherein the using of the current instruction address to index an entry from the branch target address table includes indexing an entry specifying a predicted branch target address for a branch instruction that follows the instruction pointed to by the current instruction address.

12. A method for retrieving a predicted target of a branch, comprising:

receiving a current instruction address specifying a virtual address of a currently executing instruction;

using the current instruction address to index an entry from a branch target address table, the entry including a page index and a page offset specifying a predicted branch target address;

using the page index to retrieve an entry from a translation lookaside buffer containing a page number, wherein the page index includes a thread identifier to retrieve an entry from the translation lookaside buffer corresponding to a particular thread; and retrieving an instruction from the predicted branch target address, the predicted branch target address including the page number from the translation lookaside buffer and the page offset from the branch target address table; and if the predicted branch target address is incorrect, updating the branch target table to specify a corrected branch target address.

13. An apparatus for retrieving a predicted target of a branch, comprising:

a translation lookaside buffer (TLB) for translating virtual page numbers to physical page numbers, the TLB including a plurality of entries which include a virtual page number and a corresponding physical page number;

a content addressable indexing structure coupled with the TLB, for looking up an entry in the TLB based upon a virtual page number;

a direct indexing structure coupled with the TLB, for looking up an entry in the TLB based upon an index to a location in the TLB;

a virtual page number array containing indexes to entries in the TLB, the entries in the TLB containing page numbers of predicted branch target addresses, the virtual page number array including an input and an output, the input being coupled to a current instruction address, and the output being coupled to the direct indexing structure, so that the current instruction address references an index in the virtual page number array, and this index feeds through the output into the direct indexing structure of the TLB, so that a page number for the predicted branch target address appears at an output of the TLB; and a next fetch address table containing page offsets for predicted branch target addresses, the next fetch address table including an input and an output, the input being coupled to the current instruction address, so that the current instruction address references a page offset for the predicted branch target address which appears at the output.

14. The apparatus of claim 13, wherein the next fetch address table and the virtual page number array reside in the same memory.

15. The apparatus of claim 13, wherein the page index is smaller than the page number to which it corresponds, so that storing the page index in the virtual page number array requires less space than storing the page number.

16. The apparatus of claim 13 including an instruction fetch unit with an input coupled to the virtual page number array and the next fetch address table to receive the predicted branch target address, so that the instruction fetch unit fetches an instruction from the predicted branch target address.

17. The apparatus of claim 13, including an instruction cache coupled to receive the predicted branch target address, so that the predicted branch target address is used to look up an instruction in the instruction cache.

18. The apparatus of claim 13, including a virtually-indexed physically-tagged instruction cache coupled with the next fetch address table and the TLB, and wherein the page number for the predicted branch target address includes a physical page number that is used to facilitate a lookup in the instruction cache.

19. The apparatus of claim 13, wherein the page number for the predicted branch target address includes a virtual page number that forms part of the predicated branch target address.

20. The apparatus of claim 13, including a mechanism coupled the virtual page number array and the next fetch address table to update the virtual page number array and the next fetch address table if the predicted branch target address is incorrect.

21. The apparatus of claim 13, wherein an index stored in the virtual page number array includes a thread identifier for indexing an entry from the TLB corresponding to a particular thread.

22. The apparatus of claim 13, including a mechanism coupled to the virtual page number array for invalidating entries in the virtual page number array if a corresponding entry in the TLB is modified.

23. The apparatus of claim 13, wherein the predicted branch target address specifies a start address of a block of instructions, and is used to retrieve the block of instructions.

24. The apparatus of claim 13, wherein the predicted branch target address is a predicted branch target address for a branch instruction that follows the instruction pointed to by the current instruction address.

25. An apparatus for retrieving a predicted target of a branch, comprising:

a translation lookaside buffer (TLB) for translating virtual to physical page numbers, the TLB including a plurality of entries which include a virtual page number and a corresponding physical page number;

a content addressable indexing structure coupled with the TLB, for looking up an entry in the TLB based upon a virtual page number;

a direct indexing structure coupled with the TLB, for looking up an entry in the TLB based upon an index to a location in the TLB;

a virtual page number array containing indexes to entries in the TLB which contain page numbers of predicted branch target addresses, the indexes including thread identifiers for indexing entries in the TLB corresponding to particular threads, the virtual page number array including an input and an output, the input being coupled to a current instruction address, and the output being coupled to the direct indexing structure, so that the current instruction address references an index in the virtual page number array, and this index feeds through the output into the direct indexing structure of the TLB, so that a page number for the predicted branch target address appears at an output of the TLB;

a next fetch address table containing page offsets for predicted branch target addresses, the next fetch address table including an input and an output, the input being coupled to receive the current instruction address, so that the current instruction address references a page offset for the predicted branch target address which appears at the output;

a virtually-indexed physically-tagged instruction cache coupled with the next fetch address table and the TLB, wherein the page number for the predicted branch target address includes a physical page number that is used to facilitate a lookup in the instruction cache; and a mechanism coupled the virtual page number array and the next fetch address table to update the virtual page number array and the next fetch address table if the predicted branch target address is incorrect.

26. A computer system including apparatus for retrieving a predicted target of a branch, comprising:

a semiconductor memory;

a non-volatile storage device; and a central processing unit, including:

a translation lookaside buffer (TLB) for translating virtual to physical page numbers, the TLB including a plurality of entries which include a virtual page number and a corresponding physical page number;

a content addressable indexing structure coupled with the TLB, for looking up an entry in the TLB based upon a virtual page number;

a direct indexing structure coupled with the TLB, for looking up an entry in the TLB based upon an index to a location in the TLB;

a virtual page number array containing indexes to entries in the TLB which contain page numbers of predicted branch target addresses, the virtual page number array including an input and an output, the input being coupled to a current instruction address, and the output being coupled to the direct indexing structure, so that the current instruction address references an index in the virtual page number array, and this index feeds through the output into the direct indexing structure of the TLB, so that a page number for the predicted branch target address appears at an output of the TLB; and a next fetch address table containing page offsets for predicted branch target addresses, the next fetch address table including an input and an output, the input being coupled to receive the current instruction address, so that the current instruction address references a page offset for the predicted branch target address which appears at the output.

* * * * *